United States Patent
Tewari et al.

(10) Patent No.: US 7,774,925 B2
(45) Date of Patent: Aug. 17, 2010

(54) METHOD FOR IN-SITU FOAMING OF METAL FOAM IN HOLLOW STRUCTURE

(75) Inventors: Asim Tewari, Karnataka (IN); Anil K. Sachdev, Rochester Hills, MI (US); Srinivas Subbarao, Karanataka (IN)

(73) Assignee: GM Global Technology Operations, Inc., Detroit, MI (US)

( * ) Notice: Subject to any disclaimer, the term of this patent is extended or adjusted under 35 U.S.C. 154(b) by 499 days.

(21) Appl. No.: 11/550,816

(22) Filed: Oct. 19, 2006

(65) Prior Publication Data

US 2008/0092390 A1    Apr. 24, 2008

(51) Int. Cl.
*H05B 3/00* (2006.01)
(52) U.S. Cl. .................. 29/611; 29/402.09; 29/897.1; 29/897.2; 29/897.35; 296/146.6; 296/187.02; 296/205
(58) Field of Classification Search ............ 28/611, 28/402.09, 402.18, 897.1, 897.2, 897.35; 52/101, 223.14, 309.14, 309.15, 745.19, 52/835; 296/146.6, 187.02, 187.12, 205

See application file for complete search history.

(56) References Cited

U.S. PATENT DOCUMENTS

| 2,434,775 | A | | 1/1948 | Sosnick |
| 3,087,807 | A | | 4/1963 | Alen et al. |
| 3,111,569 | A | * | 11/1963 | Rubenstein ............... 52/223.14 |
| 3,300,296 | A | | 1/1967 | Hardy et al. |
| 5,181,549 | A | | 1/1993 | Shapovalov |
| 6,233,826 | B1 | | 5/2001 | Wycech ..................... 20/897.1 |

* cited by examiner

*Primary Examiner*—Thiem Phan

(57) ABSTRACT

A method is provided for filling a hollow structure with metal foam. A mixture is made of a metal powder and a foaming agent. An electric resistance heating wire is provided and the mixture is consolidated into a solid preformed charge with the wire embedded in the charge and extending from the ends thereof. The preformed charge is placed into the hollow structure and electric current is applied to the resistance heating wire so that the metal powder is melted and the foaming agent foams the melted metal to fill the hollow structure.

29 Claims, 4 Drawing Sheets

METHOD FOR IN-SITU FOAMING OF METAL FOAM IN HOLLOW STRUCTURE

FIELD OF THE INVENTION

The present invention relates to reinforcing a hollow structure with metal foam and more particularly relates to a method for foaming the metal foam in-situ within the hollow structure.

BACKGROUND OF THE INVENTION

It is known that placing metal foam within a hollow structure, such as a tubular vehicle body component, can increase the crush resistance of the hollow structure.

Powder metal such as aluminum or zinc is mixed with a foaming agent such as Titanium Hydride (TiH2) and the mixture is compacted and placed within the hollow structure. The hollow structure is heated to in turn heat the mixture. Heating of the mixture causes melting of the powder metal and a chemical reaction that breaks down the TiH2 to release hydrogen. The expanding hydrogen bubbles create voids within the molten metal, and upon solidification of the metal, a closed cell metal foam results that closely conforms to the shape of the hollow structure to provide a light-weight and high strength reinforcement of the hollow structure.

However, the afore-described heating of the hollow structure may soften or cause a distortion of the hollow structure. Also the heating of the entire hollow structure may be disadvantageous as significant time may be needed to heat and then cool off the hollow structure. Furthermore, the heating of the mixture from the outside may permit the premature gassing of the foaming agent.

Thus it would be desirable to provide alternative methods for the in-situ foaming of a powder metal within a hollow structure.

SUMMARY OF THE INVENTION

A method is provided for filling a hollow structure with metal foam. A mixture is made of a metal powder and a foaming agent. An electric resistance heating wire is provided and the mixture is consolidated into a solid preformed charge with the wire embedded in the charge and extending from the ends thereof. The preformed charge is placed into the hollow structure and electric current is applied to the resistance heating wire so that the metal powder is melted and the foaming agent foams the melted metal to fill the hollow structure.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
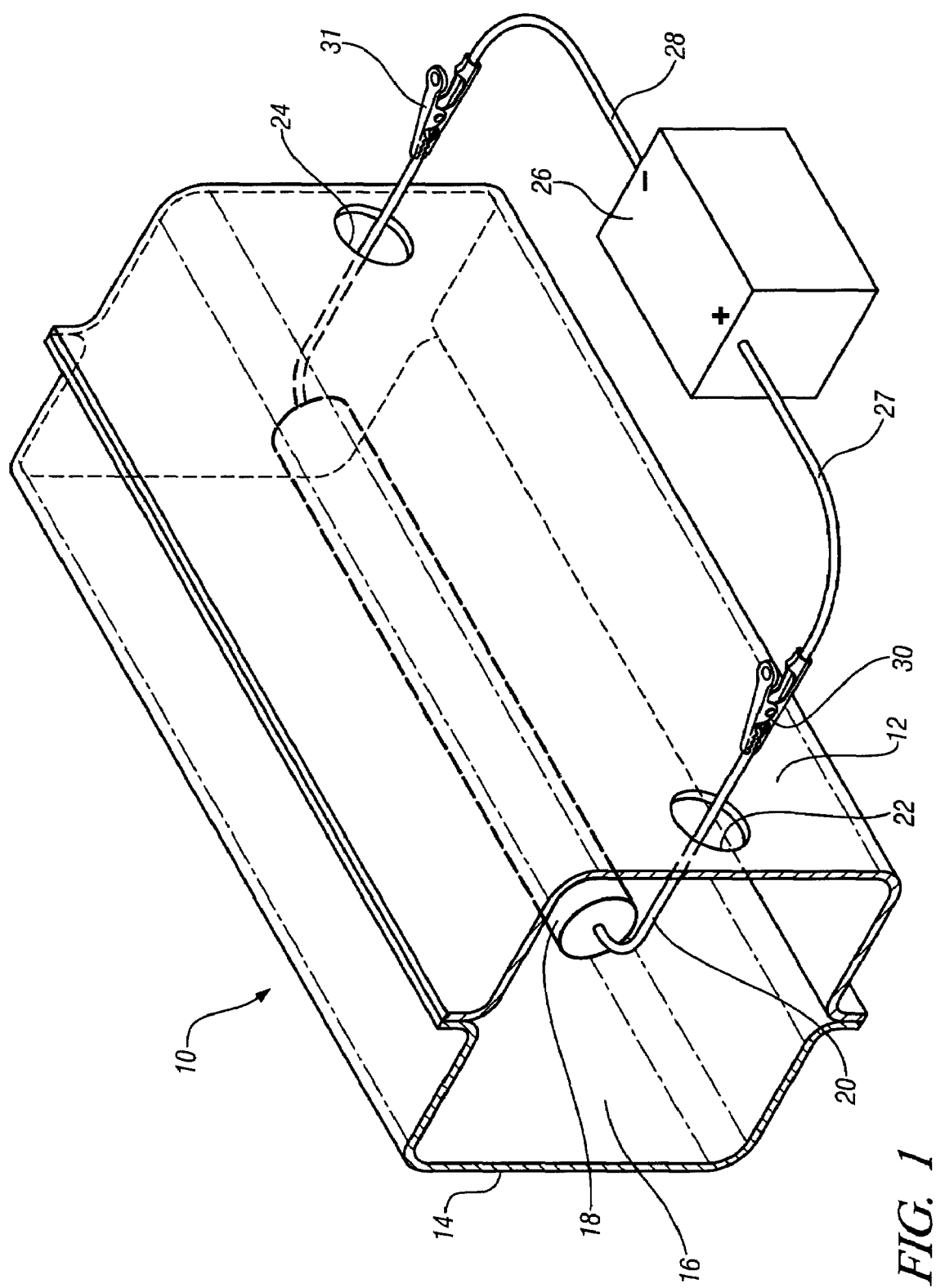
FIG. 1 is a perspective view of a vehicle rocker panel assembly having a pre-formed charge of metal foam and foaming agent placed within the rocker panel.
Figure 2:
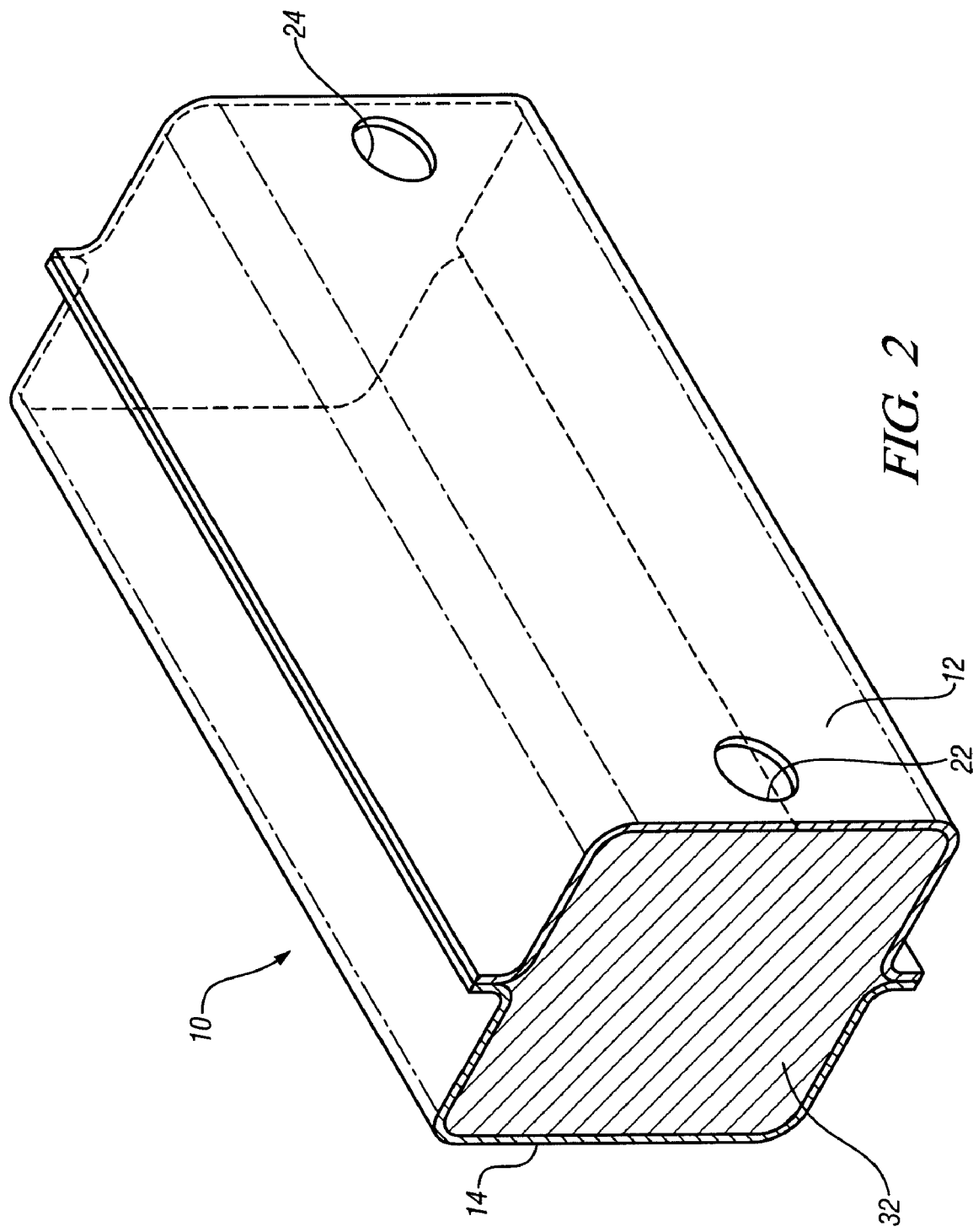
FIG. 2 is similar to FIG. 1 but shows metal foam that fills the rocker panel assembly.

Referring to FIG. 1, a vehicle rocker panel assembly 10 is shown and has been manufactured by welding together an inner panel 12 and an outer panel 14. The rocker panel assembly 10 has a hollow interior 16. FIG. 1 also shows a preformed charge 18 of a foamable precursor material, particularly a mixture of a powder metal and a foaming agent. A resistance wire 20 has been embedded within the preformed charge 18. The inner panel 12 of the rocker panel assembly 10 has a forward access hole 22 and a rearward access hole 24 through which the ends of the resistance wire 20 have been routed. The ends of the resistance wire 20 are connected to an electric controller 26 such as a welder type power supply by wire leads 27 and 28 and alligator clips 30 and 31 that will provide electric current to heat the resistance wire 20 and thereby heat the preformed charge 18, causing the foamable precursor material of the preformed charge 18 to be foamed to a solid foamed metal block 32, as shown in FIG. 2. The resistance wire 20 is preferably located in the center of the preformed charge 18 so that the foaming will progress from the center and premature off-gassing of the foaming agent is limited.

The alligator clips 27 and 28 will be removed after the foaming operation and the access holes 22 and 24 can be filled, if desired, by the foamed metal block 32 or by installing a separate plug of plastic or metal, not shown. The preformed charge 18 can be installed into the hollow interior 16 of the rocker panel assembly 10 by either feeding the preformed charge 18 through one of the access holes 22 or 24, or by installing the preformed charge 18 into place before the inner panel 12 and the outer panel 14 are welded together. Or if the rocker panel assembly has an open end, the preformed charge can be installed through the open end.

The preformed charge 18 is manufactured by mixing a powder metal such as aluminum or zinc with a foaming agent. For example aluminum powder is thoroughly mixed with less than 1% of titanium hydride (TiH2) foaming agent. This mixture is then compacted around a length of resistance wire 20 via compaction methods such as isostatic pressing or extrusion to form the preformed charge 18. A suitable binder may be added to the mixture to promote compaction. The compaction assures that the preformed charge 18 has sufficient integrity to withstand handling and insertion into the rocker panel assembly 10. In addition the compaction assures that there is only limited porosity in the preformed charge 18 to thereby prevent premature gassing of the foaming agent.

Figure 3:
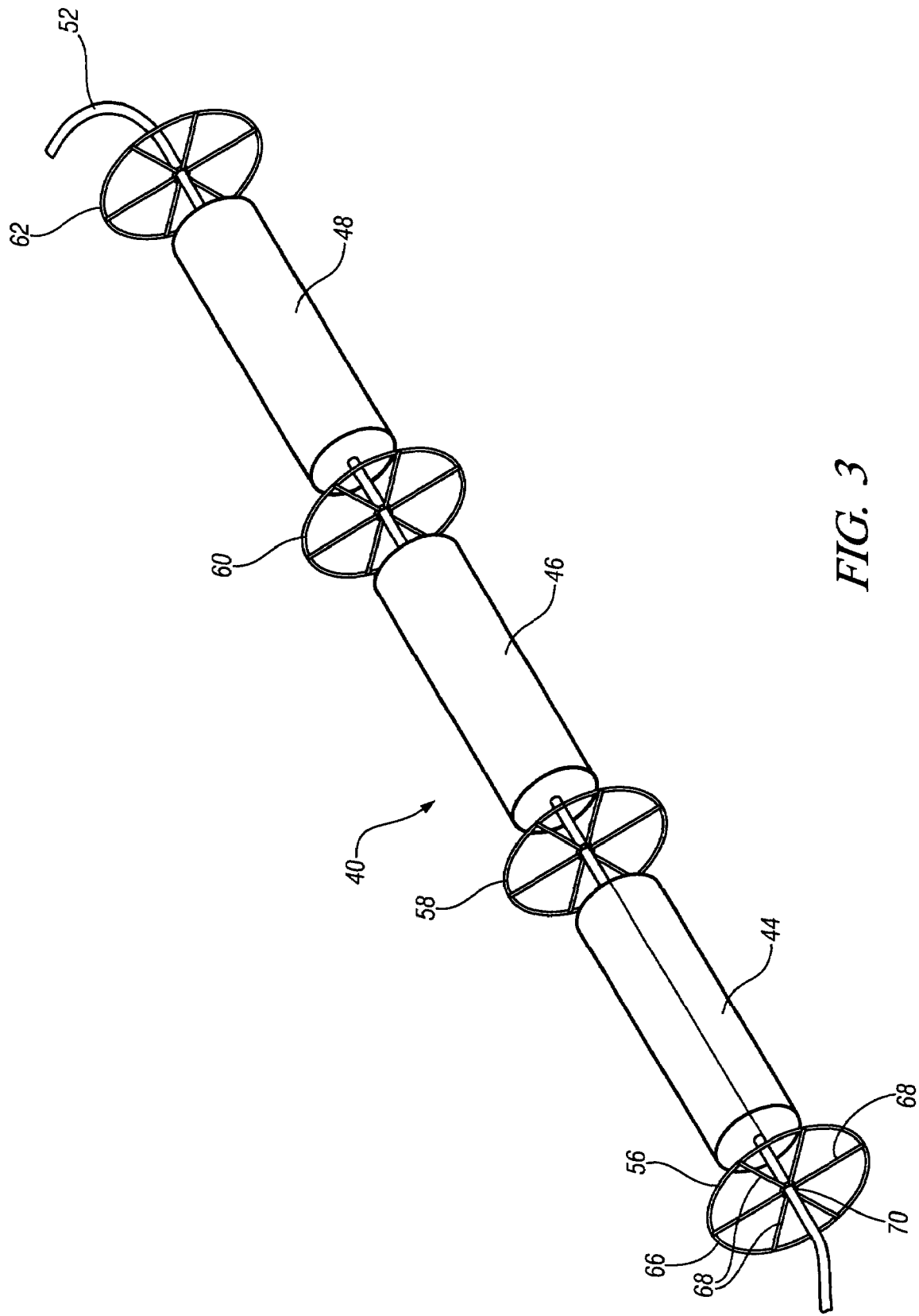
FIG. 3 is a perspective view of a preformed charge assembly.

FIG. 3 shows a preformed charge assembly 40 that includes three separate preformed charges 44, 46 and 48 that are spaced from one another along the length of a resistance wire 52. One advantage of the preformed charge assembly 40 is that it can bend around corners by bending of the resistance wire at the point between any two of the adjacent preformed charges. FIG. 3 also shows supports 56, 58, 60 and 62 that will center and support the preformed charge assembly 40 within the center of the interior of the rocker panel assembly. Support 56 is shown as constructed of an outer ring 66 of wire and a plurality of spokes 68 that connect to an inner ring 70 that fits onto the resistance wire 62. The resistance wire 52 can be insulated by having a ceramic coating provided thereon, and this coating will burn away when the resistance wire 52 is heated.

Figure 4:
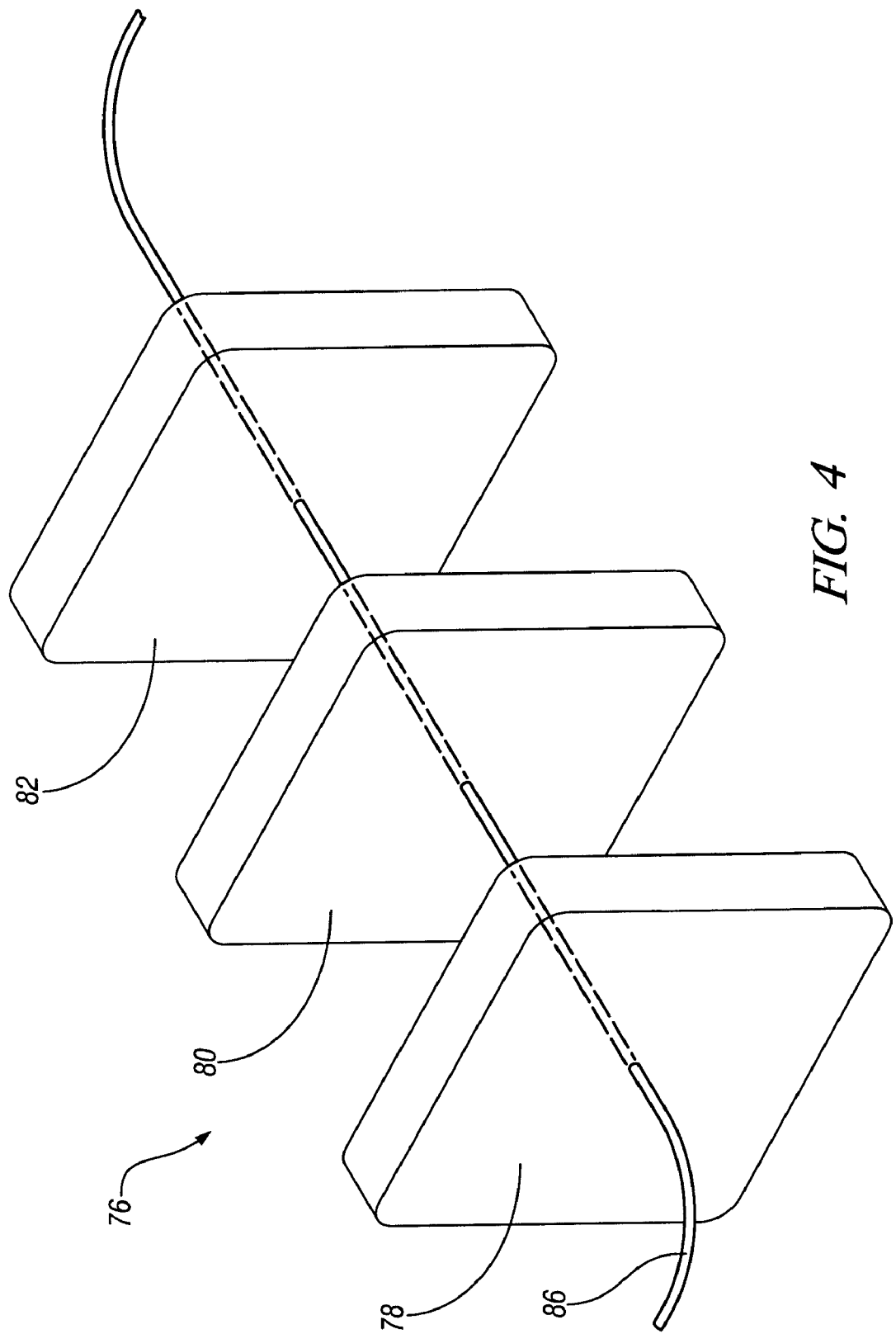
FIG. 4 is a perspective view of another preformed charge assembly.

FIG. 4 shows a preformed charge assembly 76 that includes three separate preformed charges 78, 80 and 82 that are spaced from one another along the length of a resistance wire 86. In FIG. 4, the preformed charges have a relatively large diameter and have a generally square shape that will approximate the generally rectangular shape of the rocker panel assembly, such as shown in FIG. 1. The preformed charges 78, 80 and 82 will rest upon the lower wall of the interior space of the rocker panel assembly so that the preformed charge assembly 76 is self supporting.

Thus, in comparing the shape and the spacing of the preformed charge assemblies 40 of FIGS. 3 and 76 of FIG. 4, it will be appreciated that in FIG. 3 the foaming of the powder metal will be predominately in a radially outward direction from the resistance wire 52, and in FIG. 4 the foaming of the powder metal will be predominately in the direction that is longitudinally along the length of the resistance wire 86.

The foregoing description of the invention is merely exemplary in nature and, thus, variations thereof are intended to be within the scope of the invention. For example, the preformed charge is not limited to powder aluminum, and other metal such as zinc can be used. Some examples of the powdered metal are (a.) 25.3 wt % aluminum powder and 74.7 wt % iron oxide (Fe2O3), (b.) 23.7 wt % aluminum powder and 76.3 wt % iron oxide (Fe3O4), and (c.) 47.9 wt % Titanium powder, 40.1 wt % Silicon carbide powder and 12 wt % carbon powder. A foaming agent like TiH2 is included in each charge. Other foaming agents like $ZrH_2$, $MgH_2$, $NaAlH_4$, as well as various carbonates can be used.

The construction of the supports for supporting the preformed charge within the hollow tubular structure is not limited to the wire construction that is shown in FIG. 3 and many alternatives will be available to a person of ordinary skill. For example a simple disc of paper, plastic or metal may be pierced with a hole in its center and then slipped onto the wire. Or the support can be fit onto the outside diameter of the preformed charge rather than onto the resistance wire. The support may be a cage, a disc, a leg, a sleeve or other design.

What is claimed is:

1. A method for filling a hollow structure with metal foam comprising;
   making a mixture of a metal powder and a foaming agent;
   providing a single length of bendable electric resistance heating wire;
   consolidating the mixture into a plurality of solid preformed charges spaced at intervals along the single length of electric resistance heating wire to leave intervals of bare and bendable electric resistance heating wire between the spaced apart preformed charges with the electric resistance heating wire embedded in the charge and extending from the ends thereof;
   placing the preformed charge into the hollow structure with the electric resistance wire and the preformed charges supported at or near the center of the hollow structure;
   and applying electric current to the electric resistance heating wire so that the metal powder is melted and the foaming agent foams the melted metal to expand and completely fill the hollow structure.

2. The method of claim 1 further comprising locating the electric resistance wire at or near the centerline of the preformed charge.

3. The method of claim 1 further comprising the electric resistance wire having an insulating coating thereon.

4. The method of claim 1 further comprising a plurality of disc-like supports carried by the electric resistance heating wire to support the preformed charges within the hollow structure by engaging with the hollow structure.

5. The method of claim 1 further comprising the support of the preformed charges within the hollow structure at or near the centerline of the hollow structure being provided by a plurality of discs carried by the preformed charges and engaging with the hollow structure.

6. The method of claim 1 further comprising the preformed charges being sized to closely fit within the hollow structure so as to be self supporting by engaging with the hollow structure.

7. The method of claim 1 further comprising providing access holes in the hollow structure to permit the routing of electrical connections from the electric resistance heating wire to a source of electrical current.

8. A method for filling a hollow structure with metal foam comprising;
   making a mixture of a metal powder and a foaming agent;
   providing a single length of electric resistance heating wire;
   consolidating the mixture into a plurality of solid preformed charges spaced at intervals along the electric resistance heating wire with the electric resistance heating wire embedded in the charges and extending from the ends thereof, said preformed charge being of a dimension less than the cross sectional dimension of the hollow structure;
   providing on the preformed charges or the electric resistance heating wire at spaced intervals a plurality of supports;
   placing the preformed charges into the hollow structure, the preformed charges being supported at or near the centerline of the hollow structure by the plurality of supports,
   and applying electric current to the electric resistance heating wire so that the metal powder is melted and the foaming agent foams the melted metal to expand radially outward and completely fill the hollow structure with metal foam.

9. The method of claim 8 further comprising locating the electric resistance wire at or near the centerline of the preformed charge.

10. The method of claim 8 further comprising the electric resistance wire having an insulating coating thereon.

11. The method of claim 8 further comprising providing access holes in the hollow structure to permit the routing of electrical connections from the electric resistance heating wire to a source of electrical current.

12. The method of claim 8 further comprising the use of either pressing or extrusion to consolidate the mixture around the electric resistance heating wire.

13. The method of claim 8 further comprising a plurality of disc-like supports carried by the preformed charge to support the preformed charge within the hollow structure.

14. The method of claim 8 further comprising a plurality of disc-like supports carried by the electric resistance heating wire to support the preformed charge within the hollow structure.

15. The method of claim 8 further comprising applying the electrical current by temporarily attaching wire leads to the ends of the electric resistance heating wire.

16. The method of claim 8 further comprising bending the electric resistance heating wire to accommodate the shape of the series of spaced apart preformed charges to the shape of the hollow structure.

17. The method of claim 8 further comprising said plurality of preformed charges being of a cross-sectional dimension that is substantially less than the cross-sectional dimension of the hollow structure and the preformed charges are closely spaced along the length of the electric resistance heating wire so that the foaming of the metal powder is mostly in the direction radially outwardly toward the hollow structure.

18. The method of claim 8 further comprising locating the electric resistance wire at or near the centerline of the preformed charge.

19. The method of claim 8 further comprising said preformed charges including the plurality of preformed charges being of a cross-sectional dimension that is substantially less than the cross-sectional dimension of the hollow structure and the preformed charges are closely spaced along the length of the electric resistance heating wire, and a plurality of disc-like supports support the electric resistance wire and the preformed charges at or near the centerline of the hollow structure so that the foaming of the metal powder is mostly in the direction radially outwardly toward the hollow structure.

20. A method for filling a hollow structure with metal foam comprising;
providing a single length of electric resistance heating wire;
mixing a mixture of a metal powder and a foaming agent;
consolidating the mixture about the length of electric resistance heating wire at spaced intervals to form a plurality of spaced apart preformed charges and define intervals of bendable bare electric resistance heating wire between the spaced apart preformed charges;
supporting the electric resistance heating wire and preformed charges within the hollow structure by providing the plurality of preformed charges with a dimension sized to closely fit within the hollow structure so as to be self-supporting with the preformed charges centered within the hollow structure;
and applying electric current to the electric resistance heating wire creating heat sufficient to melt the metal powder and activate the foaming agent to foam the melted metal to expand and completely fill the hollow structure.

21. The method of claim 20 further comprising the use of either pressing or extrusion to consolidate the mixture around the electric resistance heating wire.

22. The method of claim 20 further comprising locating the electric resistance wire at or near the centerline of the preformed charges.

23. The method of claim 20 further comprising the electric resistance wire having an insulating coating thereon.

24. The method of claim 20 further comprising applying the electrical current by temporarily attaching wire leads to the ends of the electric resistance heating wire.

25. The method of claim 20 further comprising bending the electric resistance heating wire to accommodate the shape of the series of spaced apart preformed charges to the shape of the hollow structure.

26. A method for filling a hollow structure with metal foam comprising;
making a mixture of a metal powder and a foaming agent;
providing a length of electric resistance heating wire;
consolidating the mixture into a plurality of preformed charges compacted about the electric resistance heating wire at spaced apart intervals along the length of the electric resistance heating wire to form a preformed charge assembly having ends of the electric resistance heating wire extending from preformed charge assembly;
placing the preformed charge assembly into the hollow structure;
and applying electric current to the electric resistance heating wire so that the metal powder is melted and the foaming agent foams the melted metal to fill the hollow structure.

27. The method of claim 26 further comprising said plurality of preformed charges being of a cross-sectional dimension that is nearly the cross-sectional dimension of the hollow structure and the preformed charges are spaced substantially apart along the length of the electric resistance heating wire so that the foaming of the metal powder is mostly in the direction along the length of the electric resistance heating wire to fill the space between the spaced apart preformed charges.

28. The method of claim 26 further comprising said plurality of preformed charges being of a cross-sectional dimension that is substantially less than the cross-sectional dimension of the hollow structure and the preformed charges are closely spaced along the length of the electric resistance heating wire so that the foaming of the metal powder is mostly in the direction radially outwardly toward the hollow structure.

29. The method of claim 28 further comprising supporting the preformed charge assembly at or near the center of the hollow structure.

* * * * *